(12) United States Patent
Miura

(10) Patent No.: US 9,902,858 B2
(45) Date of Patent: Feb. 27, 2018

(54) NONLINEAR OPTICAL DYE, PHOTOREFRACTIVE MATERIAL COMPOSITION, PHOTOREFRACTIVE SUBSTRATE AND HOLOGRAM RECORDING MEDIUM

(71) Applicant: TOYO KOHAN CO., LTD., Tokyo (JP)

(72) Inventor: Sakiko Miura, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 15/134,802

(22) Filed: Apr. 21, 2016

(65) Prior Publication Data

US 2016/0230010 A1 Aug. 11, 2016

Related U.S. Application Data

(63) Continuation-in-part of application No. PCT/JP2014/078207, filed on Oct. 23, 2014.

(30) Foreign Application Priority Data

Oct. 25, 2013 (JP) ................................ 2013-221815

(51) Int. Cl.
| | | |
|---|---|---|
| G11B 7/24 | (2013.01) | |
| G03H 1/02 | (2006.01) | |
| C09B 51/00 | (2006.01) | |
| G02F 1/361 | (2006.01) | |
| G11B 7/24044 | (2013.01) | |
| G11B 7/246 | (2013.01) | |
| G02B 1/04 | (2006.01) | |
| C09B 29/44 | (2006.01) | |

(52) U.S. Cl.
CPC .......... *C09B 51/00* (2013.01); *C09B 29/3643* (2013.01); *G02B 1/04* (2013.01); *G02F 1/3612* (2013.01); *G03H 1/02* (2013.01); *G11B 7/246* (2013.01); *G11B 7/24044* (2013.01); *G03H 2001/0264* (2013.01); *G03H 2260/54* (2013.01)

(58) Field of Classification Search
None
See application file for complete search history.

(56) References Cited

U.S. PATENT DOCUMENTS

| | | | | |
|---|---|---|---|---|
| 3,314,926 A * | 4/1967 | Gerard Kraus | ...... | C08K 5/3462 525/332.7 |
| 3,738,990 A * | 6/1973 | Beaman et al. | ................ | 546/298 |
| 3,826,746 A * | 7/1974 | Schick et al. | ............ | C10M 1/08 508/162 |
| 3,966,741 A * | 6/1976 | Hendrickx | ............ | C07D 213/70 546/296 |
| 4,189,556 A * | 2/1980 | Karayannis | ............. | C08F 10/00 502/117 |
| 4,276,899 A * | 7/1981 | Kirk-Duncan | .......... | F16K 31/50 137/327 |
| 4,413,128 A * | 11/1983 | Chemla | ................ | C07D 213/89 546/312 |
| 4,472,409 A * | 9/1984 | Senn-Bilfinger | .... | C07D 213/68 514/338 |
| 4,737,232 A * | 4/1988 | Flicstein | .................. | B05D 1/60 117/108 |

(Continued)

FOREIGN PATENT DOCUMENTS

| | | | |
|---|---|---|---|
| CN | 10210841 | * | 6/2011 |
| ES | 2060541 | * | 11/1994 |

(Continued)

OTHER PUBLICATIONS

Johnson et al., "Acidity functions and the protonation of weak basis. Part VI. Te amiode acidity function : It's extension and application to N-oxides", J. Chem. Soc. B pp. 1235-1237 (1967).*

Atsuyuki et al. "Novel 1,4-dihydropyridine calcium anatgonists I. Synthesis and hypotensive activity of 4-(substituted pyridyl)-1,4-dihydropyridine derivatives", Chem. Pharm Bull. vol. 38(9) pp. 2446-2458 (1990).*

Hanuza et al., "Crystal structure and polarized vibrational spectra of 2-bromo-4-nitropyridine N-oxide single crystal". J. Raman Spect., vol. 33 pp. 229-237 (2002).*

Nicoud et al., "Organic SHG powder test data", in Nonlinear optical properties of organic molecules and crystals, vol. 2, pp. 221-254 (1987).*

STN abstract of Ciurla et al, "Some reactions of 3-halo-4-nitropicoline N-oxides", Pol. J Chem., vol. 59(10-12) pp. 1089-97 (1986), dated May 1987.*

Zyss et al., "Demonstration of efficiency nonlinear optical crystals with vanishing molecular dipole monoment: second-Harmonic generation in 3-methyl-4-nitropyridine-1-oxide", J. Chem. Phys., vol. 74(9) pp. 4800-4811 (1981).*

(Continued)

*Primary Examiner* — Martin Angebranndt

(74) *Attorney, Agent, or Firm* — Muncy, Geissler, Olds & Lowe, P.C.

(57) ABSTRACT

A nonlinear optical dye includes a compound represented by the general formula (1) below.

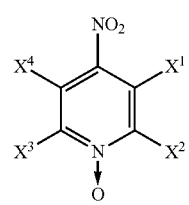

(1)

In the above general formula (1), each of $X^1$, $X^2$, $X^3$ and $X^4$ independently represents a hydrogen atom, an alkyl group having a carbon number of 1 to 6, a halogen atom, a hydroxyl group, a nitro group, a cyano group, or a methylsulfonyl group. In the present invention, it is preferred that each of $X^1$, $X^2$, $X^3$ and $X^4$ independently represents a hydrogen atom, an alkyl group having a carbon number of 1 to 6, or a halogen atom. In the present invention, it is also preferred that the nonlinear optical dye has a dipole moment of 2.1 D or less and a maximum absorption wavelength within a range of 315 to 360 nm.

3 Claims, 4 Drawing Sheets

(56) References Cited

U.S. PATENT DOCUMENTS

| | | | | |
|---|---|---|---|---|
| 4,759,820 | A | * 7/1988 | Calvert | C08K 3/0008 252/582 |
| 4,959,477 | A | * 9/1990 | Etter | G02F 1/3612 546/307 |
| 5,177,205 | A | 1/1993 | Flicstein et al. | |
| 5,348,687 | A | 9/1994 | Beck et al. | |
| 7,732,534 | B2 | * 6/2010 | Luo | C08C 19/22 525/326.1 |
| 7,919,755 | B2 | * 4/2011 | Rahman | G02F 1/353 250/341.1 |
| 2006/0126141 | A1 | * 6/2006 | Hirao | G03H 1/02 359/3 |
| 2007/0010542 | A1 | * 1/2007 | Miyazawa | C07D 405/14 514/278 |

FOREIGN PATENT DOCUMENTS

| | | |
|---|---|---|
| JP | 1-259056 A | 10/1989 |
| JP | 02-009784 A1 | 12/1990 |
| JP | 03-215472 * | 9/1991 |
| JP | 06-003714 * | 1/1994 |
| JP | 200618113 | 1/2006 |
| JP | 2007-41324 A | 2/2007 |

OTHER PUBLICATIONS

Akiyoshi Tanaka et al., "Asymmetric Energy Transfer in Photorefractive Polymer Composites under Non-Electric Field," *Molecular Crystals and Liquid Crystals*, vol. 504, pp. 44-51, 2009.

Fodil Hamzaoui et al., "The molecular dipole moment of the non-linear optical 3-methyl 4-nitropyridine N-oxide molecule: X-ray diffraction and semi-empirical studies," *J. Mater. Chem.*, vol. 6, No. 7, pp. 1123-1130, 1996.

Corresponding Japanese Application No. 2013-221815, dated Jan. 9, 2018, with English translation.

* cited by examiner

NONLINEAR OPTICAL DYE, PHOTOREFRACTIVE MATERIAL COMPOSITION, PHOTOREFRACTIVE SUBSTRATE AND HOLOGRAM RECORDING MEDIUM

BACKGROUND OF THE INVENTION

1. Technical Field of the Invention

The present invention relates to a nonlinear optical dye used in the technical fields of optical recording and the like and also to a photorefractive material composition, a photorefractive substrate and a hologram recording medium that are obtained using the nonlinear optical dye.

2. Description of the Related Art

Photorefractive materials are materials in which, when two light beams are crossed on or in a photorefractive material, the refractive index varies in response to a spatial electric field caused by the interference of the light beams.

Therefore, by utilizing such properties of photorefractive materials, the photorefractive materials can be applied as optical modulation elements that perform nonlinear signal processing of signal light beams. More specifically, the photorefractive materials can be used as hologram recording media utilizing formation of diffraction gratings and as optical switching elements utilizing energy transfer. The photorefractive materials can also be used as phase-conjugate mirrors because the diffracted light generated from the diffraction grating is phase-conjugate light.

Inorganic photorefractive materials have conventionally been used as such photorefractive materials. In recent years, photorefractive materials using amorphous organic compounds (referred to as "organic photorefractive materials" hereinafter) are required to be developed as substitute for the inorganic photorefractive materials because the organic photorefractive materials can be manufactured at low cost and have excellent formability and workability.

For example, Patent Document 1 (Japanese Patent Application Publication No. 2007-41324) discloses, as such an organic photorefractive material, an organic photorefractive material comprising an organic photoconductive compound, a sensitizer, a plasticizer, an electric field responsive optical function compound, and an antioxidant. However, the organic photorefractive material disclosed in the above Patent Document 1 has a problem in that the diffraction response speed is low.

A nonlinear optical dye having a specific absorption spectrum is used as a material that constitutes an organic photorefractive material. For example, Non-Patent Document 1 (Akiyoshi Tanaka et al., "Asymmetric Energy Transfer in Photorefractive Polymer Composites under Non-Electric Field," Molecular Crystals and Liquid Crystals, Vol. 504, pp 44-51, 2009) discloses a technique of manufacturing an organic photorefractive material by using 3-[(4-nitrophenyl)azo]-9H-carbazole-9-ethanol as a nonlinear optical dye and compounding a polymer having inactive photorefractive properties as a binder material in the nonlinear optical dye. However, also in the organic photorefractive material using a nonlinear optical dye as disclosed in the above Non-Patent Document 1, the problem is that the diffraction response speed is low as in the above-described Patent Document 1.

Moreover, in the above disclosure of Non-Patent Document 1, the 3-[(4-nitrophenyl)azo]-9H-carbazole-9-ethanol used as a nonlinear optical dye has an absorption band in the visible light region and can only transmit light of wavelengths near the red light in the visible light region. Therefore, when the obtained organic photorefractive material is used as a hologram recording medium, the holographic image can be obtained only with red color, which will be problematic.

SUMMARY OF THE INVENTION

An object of the present invention is to provide a nonlinear optical dye capable of realizing a photorefractive substrate from which holographic images can be reconstructed with three primary colors of red, blue and green and which has a high transmittance and excellent diffraction response speed and diffraction efficiency. Another object of the present invention is to provide a photorefractive material composition, a photorefractive substrate and a hologram recording medium which are obtained using such a nonlinear optical dye.

As a result of intensive studies to achieve the above objects, the present inventor has found that, by using a compound having a 4-nitropyridine N-oxide structure as a nonlinear optical dye, there can be obtained a photorefractive substrate from which holographic images can be reconstructed with three primary colors of red, blue and green and which has a high transmittance and excellent diffraction response speed and diffraction efficiency. The inventor has thus accomplished the present invention.

That is, according to an aspect of the present invention, there is provided a nonlinear optical dye comprising a compound represented by the general formula (1) below.

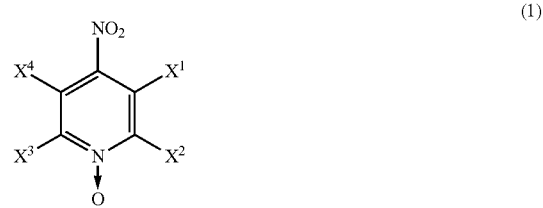

(1)

(In the above general formula (1), each of $X^1$, $X^2$, $X^3$ and $X^4$ independently represents a hydrogen atom, an alkyl group having a carbon number of 1 to 6, a halogen atom, a hydroxyl group, a nitro group, a cyano group, or a methylsulfonyl group.)

Preferably, each of $X^1$, $X^2$, $X^3$ and $X^4$ in the above general formula (1) independently represents a hydrogen atom, an alkyl group having a carbon number of 1 to 6, or a halogen atom.

Preferably, the above nonlinear optical dye has a dipole moment value of 2.1 D or less and a maximum absorption wavelength within a range of 315 to 360 nm.

According to another aspect of the present invention, there are provided a photorefractive material composition and a photorefractive substrate which are obtained using the nonlinear optical dye as described above, and a hologram recording medium comprising the photorefractive substrate.

Effect of Invention

According to the present invention, there can be provided a nonlinear optical dye capable of realizing a photorefractive substrate from which holographic images can be reconstructed with three primary colors of red, blue and green and which has a high transmittance and excellent diffraction response speed and diffraction efficiency. Moreover, according to the present invention, there can be provided a photorefractive material composition, a photorefractive substrate, and a hologram recording medium which are obtained using the nonlinear optical dye.

DESCRIPTION OF THE PREFERRED EMBODIMENT

Figure 1A:
FIGS. 1A-1D are a set of photographs showing views when recording a hologram image in a photorefractive substrate obtained in an example and reconstructing holographic images from the hologram image.

The nonlinear optical dye of the present invention is a compound represented by the general formula (1) below. As will be understood, the nonlinear optical dye is used as a material for manufacturing a photorefractive material composition, for example. The photorefractive material composition containing such a nonlinear optical dye can be used as a material of a photorefractive substrate which constitutes, for example, a hologram recording medium, an optical switching element utilizing energy transfer, or the like.

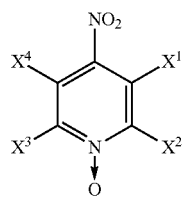

(1)

In the above general formula (1), each of $X^1$, $X^2$, $X^3$ and $X^4$ independently represents a hydrogen atom, an alkyl group having a carbon number of 1 to 6, a halogen atom, a hydroxyl group, a nitro group, a cyano group, or a methylsulfonyl group. In consideration that the photorefractive properties can be more enhanced, each of $X^1$, $X^2$, $X^3$ and $X^4$ preferably independently represents a hydrogen atom, an alkyl group having a carbon number of 1 to 6, or a halogen atom. Among alkyl groups each having a carbon number of 1 to 6, methyl group and ethyl group are preferred, and methyl group is more preferred. As the halogen atom, chlorine atom and bromine atom are preferred, and chlorine atom is more preferred.

Any compound represented by the above general formula (1) may be used as the nonlinear optical dye of the present invention. However, among the compounds represented by the above general formula (1), those having a dipole moment value of 2.1 D or less and a maximum absorption wavelength within a range of 315 to 360 nm are preferred, because such compounds have a transmission region within a relatively wide range in the visible light region thereby to allow holographic images to be well reconstructed with three primary colors of red, blue and green, and can have a high transmittance and excellent diffraction response speed and diffraction efficiency. It is more preferred that the dipole moment value is 0.20 D or more and 2.10 D or less and the maximum absorption wavelength is within a range of 315 to 360 nm.

In particular, according to the feature that the dipole moment value is within the above range in an aspect of the present invention, the diffraction efficiency can be enhanced in the photorefractive substrate obtained using the nonlinear optical dye, and when the obtained photorefractive substrate is used as a material of a hologram recording medium, the writing property of a hologram image using an object beam and a reference beam can be improved. In addition, according to the feature that the maximum absorption wavelength of the nonlinear optical dye is within the above range, when the nonlinear optical dye is used as a material of a hologram recording medium, the wavelength of laser beams used for writing of a hologram image can be within the visible light region, e.g. within a range of about 380 to 470 nm. This allows the operator to visually recognize the laser beams when performing the writing of a hologram image, and the workability is improved in the writing of a hologram image.

The maximum absorption wavelength can be measured through dissolving the nonlinear optical dye in a solvent and performing measurement of the absorbance within a range of 190 to 1,000 nm to obtain a wavelength at which the absorbance is the maximum.

Preferred examples of the compounds of which the dipole moment value and the maximum absorption wavelength are within the above ranges include, but are not particularly limited to, compounds as below:

(A) compounds in which $X^1$ and $X^2$ are each an alkyl group having a carbon number of 1 to 6, and $X^3$ and $X^4$ are each a hydrogen atom, a halogen atom, a hydroxyl group, a nitro group, a cyano group, or a methylsulfonyl group, particularly preferably a hydrogen atom;

(B) compounds in which $X^2$ is an alkyl group having a carbon number of 1 to 6, and $X^1$, $X^3$ and $X^4$ are each a hydrogen atom, a halogen atom, a hydroxyl group, a nitro group, a cyano group, or a methylsulfonyl group, particularly preferably a hydrogen atom;

(C) compounds in which $X^1$ is an alkyl group having a carbon number of 1 to 6, $X^4$ is a halogen atom, and $X^2$ and $X^3$ are each a hydrogen atom, a hydroxyl group, a nitro group, a cyano group, or a methylsulfonyl group, particularly preferably a hydrogen atom;

(D) compounds in which one of $X^1$, $X^2$, $X^3$ and $X^4$ is a halogen atom, and the three others are each a hydrogen atom, an alkyl group having a carbon number of 1 to 6, a hydroxyl group, a nitro group, a cyano group, or a methylsulfonyl group, particularly preferably a hydrogen atom;

(E) compounds in which two of $X^1$, $X^2$, $X^3$ and $X^4$ are each a halogen atom, and the two others are each a hydrogen atom, an alkyl group having a carbon number of 1 to 6, a hydroxyl group, a nitro group, a cyano group, or a methylsulfonyl group, particularly preferably a hydrogen atom;

(F) compounds in which one of $X^1$, $X^2$, $X^3$ and $X^4$ is a hydroxyl group, and the three others are each a hydrogen atom, an alkyl group having a carbon number of 1 to 6, a halogen atom, a nitro group, a cyano group, or a methylsulfonyl group, particularly preferably a hydrogen atom; and (G) compounds in which $X^1$, $X^2$, $X^3$ and $X^4$ are each a hydrogen atom.

On the other hand, among the compounds represented by the above general formula (1), compounds in which $X^1$ is an alkyl group having a carbon number of 1 to 3 and $X^2$, $X^3$ and $X^4$ are each a hydrogen atom will have a maximum absorption wavelength of less than 315 nm, for example, and when such compounds are used as materials of hologram recording media, the wavelength of laser beams used for writing of a hologram image may not be able to be a wavelength within the visible light region, and the workability may possibly be deteriorated in the writing of a hologram image.

Among the compounds as described above, compounds represented by the formulae (2) to (12) below are also preferred. These formulae below are presented with the dipole moment value and the maximum absorption wavelength of each compound which are calculated by a Gaussian09 program used in the examples and comparative examples to be described later.

(2)

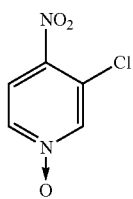

the maximum absorption wavelength: 322.7 nm
the dipole moment value: 1.51 D (3)

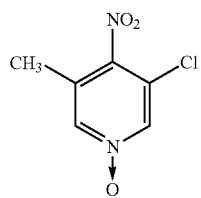

the maximum absorption wavelength: 319.2 nm
the dipole moment value: 1.84 D (4)

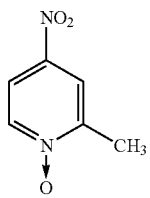

the maximum absorption wavelength: 336.3 nm
the dipole moment value: 1.86 D (5)

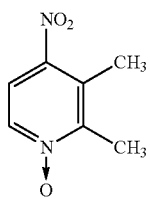

the maximum absorption wavelength: 332.3 nm
the dipole moment value: 2.09 D (6)

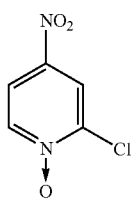

the maximum absorption wavelength: 336.8 nm
the dipole moment value: 1.08 D (7)

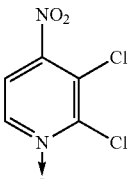

the maximum absorption wavelength: 330.3 nm
the dipole moment value: 1.65 D (8)

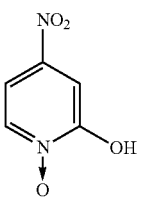

the maximum absorption wavelength: 340.2 nm
the dipole moment value: 1.45 D (9)

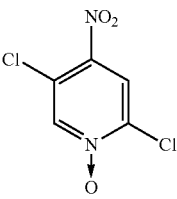

the maximum absorption wavelength: 330.0 nm
the dipole moment value: 0.88 D (10)

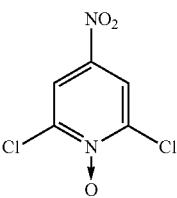

the maximum absorption wavelength: 336.2 nm
the dipole moment value: 0.29 D (11)

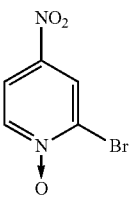

the maximum absorption wavelength: 342.1 nm
the dipole moment value: 1.15 D (12)

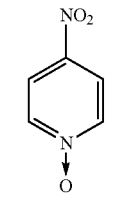

the maximum absorption wavelength: 330.0 nm
the dipole moment value: 1.17 D

Examples of the nonlinear optical dye of the present invention include compounds represented by the above formulae (2) to (12), among which compounds represented by the above formulae (2), (4) to (6) and (12) are particularly preferred in consideration that the photorefractive properties can be more enhanced.

On the other hand, in the compounds having a pyridine N-oxide structure other than the compounds represented by the above general formula (1), e.g. in the compounds represented by the formulae (13) to (27) below, the dipole moment value is larger than 2.1 D or the maximum absorption wavelength is not within a range of 315 to 360 nm as presented together with the formulae below. Therefore, if such compounds are used as nonlinear optical dyes, the writing property of a hologram image and/or the workability in writing of a hologram image will be deteriorated. These formulae below are also presented with the dipole moment value and the maximum absorption wavelength of each compound which are calculated by the Gaussian09 program as used in the examples and comparative examples to be described later.

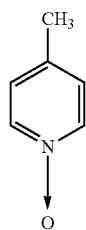

(13)

the maximum absorption wavelength: 268.8 nm
the dipole moment value: 5.13D

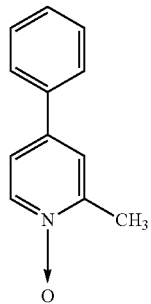

(14)

the maximum absorption wavelength: 303.9 nm
the dipole moment value: 4.96D

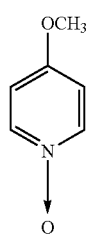

(15)

the maximum absorption wavelength: 268.6 nm
the dipole moment value: 4.80D

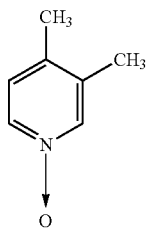

(16)

the maximum absorption wavelength: 299.8 nm
the dipole moment value: 5.40D

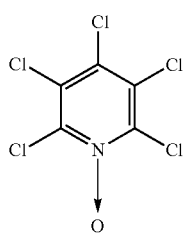

(17)

the maximum absorption wavelength: 315.7 nm
the dipole moment value: 2.60D

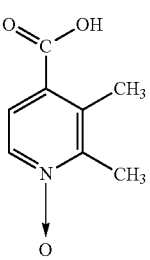

(18)

the maximum absorption wavelength: 289.4 nm
the dipole moment value: 2.79D

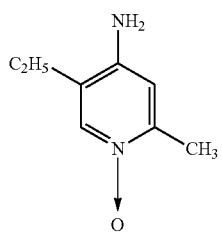

(19)

the maximum absorption wavelength: 295.7 nm
the dipole moment value: 4.73D

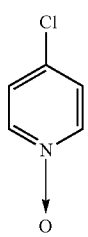

(20)

the maximum absorption wavelength: 308.3 nm
the dipole moment value: 2.86D

-continued

(21) 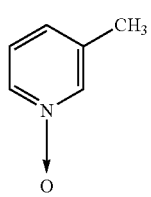

the maximum absorption wavelength: 298.2 nm
the dipole moment value: 4.74D

(22) 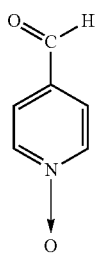

the maximum absorption wavelength: 299.95 nm
the dipole moment value: 2.07D

(23) 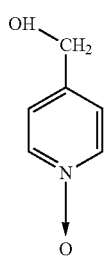

the maximum absorption wavelength: 270.0 nm
the dipole moment value: 6.23D

(24) 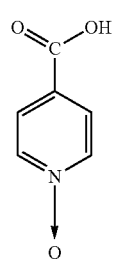

the maximum absorption wavelength: 288.8 nm
the dipole moment value: 2.85D

(25) 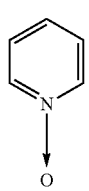

the maximum absorption wavelength: 295.5 nm
the dipole moment value: 4.48D

(26) 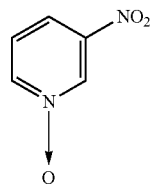

the maximum absorption wavelength: 415.3 nm
the dipole moment value: 4.50D

(27) 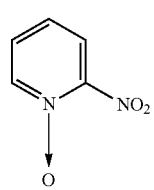

the maximum absorption wavelength: 332.3 nm
the dipole moment value: 7.21D

<Photorefractive Material Composition>

The photorefractive material composition of the present invention is a composition which contains the above-described nonlinear optical dye of the present invention and in which a non-photoconductive transparent resin is further compounded. As described above, the photorefractive material composition can be used as a material of a photorefractive substrate which constitutes a hologram recording medium, an optical switching element utilizing energy transfer, or the like.

The content ratio of the nonlinear optical dye in the photorefractive material composition is preferably 5 to 40 wt %, more preferably 10 to 30 wt %, and further preferably 10 to 20 wt %. If the content ratio of the nonlinear optical dye is unduly small, the photorefractive properties of the obtained photorefractive substrate may possibly be insufficient. If the content ratio of the nonlinear optical dye is unduly large, the obtained photorefractive substrate may not be transparent because the nonlinear optical dye will be crystallized to appear as an opaque substance in the photorefractive substrate.

Any resin may be used as the non-photoconductive transparent resin, provided that the resin is inactive in photoconductivity, has transparency, and acts as a matrix resin. Examples of the resin include polyethylene terephthalate (PET), polycarbonate (PC), cycloolefin polymer (COP), and acrylic resins such as polymethyl methacrylate (PMMA), polyethyl methacrylate (PEMA) and polybutyl methacrylate (PBMA). Among them, the polymethyl methacrylate (PMMA) is particularly preferred because of the high transparency.

The weight-average molecular weight (Mw) of the non-photoconductive transparent resin is preferably within a range of 15,000 to 3,500,000, more preferably within a range of 97,000 to 2,500,000, and further preferably 350,000 to 1,500,000. If the weight-average molecular weight is unduly small, the mechanical strength may possibly deteriorate. On the other hand, if the weight-average molecular weight is unduly large, synthesis of polymer will be difficult.

The content ratio of the non-photoconductive transparent resin in the photorefractive material composition is preferably 60 to 95 wt %, more preferably 70 to 90 wt %, and further preferably 80 to 90 wt %. If the content ratio of the non-photoconductive transparent resin is unduly small, the transparency of the obtained photorefractive substrate may possibly be deteriorated, while on the other hand, if the content ratio is unduly large, sufficient nonlinear optical effect will not be obtained.

In addition, the photorefractive material composition of the present invention may contain a plasticizer. The plasticizer has an action of reducing the glass transition temperature Tg of the obtained photorefractive substrate and thereby enhancing the mobility of the nonlinear optical dye, so that the diffraction response speed can be improved.

The plasticizer is not particularly limited, and any conventionally-known one may be used without restriction, but in consideration of compatibility to the non-photoconductive transparent resin, it is preferred to use a plasticizer in which, when the SP value (dissolution parameter) of the non-photoconductive transparent resin is $SP_R$ and the SP value of the plasticizer is $SP_P$, the difference therebetween $|SP_R-SP_P|$ is 3 or less, and it is more preferred to use a plasticizer in which the difference $|SP_R-SP_P|$ is 2 or less.

Specific examples of the plasticizer include: adipate esters such as di(2-ethylhexyl) adipate, diisodecyl adipate and di(butoxyethoxyethyl) adipate; azelate esters such as dibutoxyethyl azelate and di(2-ethylhexyl) azelate; citrate esters such as tri-n-butyl citrate; epoxy derivatives such as epoxidized compound of tetrahydroxy phthalic acid anhydride, epoxy compound of tetrahydroxy phthalic acid anhydride and epoxidized unsaturated oil of tetrahydroxy phthalic acid anhydride; phthalate esters such as di(2-ethylhexyl) phthalate, di-n-octyl phthalate, diisobutyl phthalate and diheptyl phthalate; trimellitate esters such as (2-ethylhexyl) trimellitate, tri-n-octyl trimellitate, triisodecyl trimellitate and triisooctyl trimellitate; phosphate esters such as 2-ethylhexyldiphenyl phosphate; glycol diacetates such as diethylene glycol diacetate; and alkyl phthalyl alkyl glycolates such as ethyl phthalyl ethyl glycolate, propyl phthalyl propyl glycolate, butyl phthalyl butyl glycolate, octyl phthalyl octyl glycolate.

The content ratio of the plasticizer in the photorefractive material composition is preferably 0.01 to 41 wt %, more preferably 1 to 35 wt %, and further preferably 5 to 30 wt %. According to the feature that the content ratio of the plasticizer is within the above range, the effect of adding the plasticizer, or the effect of improving the diffraction response speed, can be more significant.

In addition to the above-described components, various other components such as antioxidant may be compounded in the photorefractive material composition of the present invention.

The photorefractive material composition of the present invention may further contain a solvent as necessary. Any solvent can be used without restriction, provided that the solvent can dissolve the photorefractive material composition. Examples of the solvent include tetrahydrofuran (THF), N-methylpyrrolidone (NMP), and N,N-dimethylformamide (DMF).

<Photorefractive Substrate>

The photorefractive substrate of the present invention is obtained using the above-described photorefractive material composition of the present invention and has, for example, a film-like shape.

When the photorefractive substrate is formed into a film-like shape, the thickness is preferably, but not particularly limited to, 10 to 500 μm, and more preferably 50 to 300 μm. According to the feature that the thickness of the photorefractive substrate is within the above range, the diffraction efficiency can be enhanced, and the writing property of a hologram image using an object beam and a reference beam can be improved when the photorefractive substrate is used as a hologram recording medium. If the thickness of the photorefractive substrate is unduly thick, the inside of the photorefractive substrate will not be uniform, and the image quality of the written hologram image may deteriorate when the photorefractive substrate is used as a hologram recording medium.

The photorefractive substrate of the present invention can be manufactured, for example, by forming a film using the above-described photorefractive material composition of the present invention.

When a film is formed using the photorefractive material composition of the present invention, any publicly-known method of film forming can be used, such as a spin coating method of coating a base material such as a glass plate with the photorefractive material composition by spin coating and a casting method of directly applying a solution of the photorefractive material composition to a base material, such as by dropping, and casting the solution in accordance with the desired film thickness and shape. After the film is formed, the film may be dried by heating at a temperature of about 30° C. to 110° C., if necessary, to remove the solvent. Thereafter, the film is released from the base material or the like, and the photorefractive substrate can thus be obtained.

The photorefractive substrate of the present invention obtained in such a manner has a high transmittance and excellent diffraction response speed and diffraction efficiency. Taking advantage of such properties, the photorefractive substrate of the present invention can be preferably used not only as a hologram recording medium but also for various uses, such as in high-density optical data recording, 3D display, 3D printer, manipulation of wave surface and phase of light, pattern recognition, optical amplification, nonlinear optical information processing, optical correlation system, and optical computer.

Furthermore, the photorefractive substrate of the present invention can transmit light of wavelengths near the red, blue and green light in the visible light region because the photorefractive substrate is manufactured using the above-described nonlinear optical dye. According to this feature, when a hologram image is recorded in the photorefractive substrate of the present invention using laser beams, holographic images can be reconstructed from the recorded hologram image with three primary colors of red, blue and green, and the photorefractive substrate can be particularly preferably used as a hologram recording medium.

EXAMPLES

The present invention will be more specifically described with reference to examples, but the present invention is not limited to these examples.

Example 1

First, a compound (3-chloro-4-nitropyridine N-oxide) represented by the above formula (2) was prepared as a nonlinear optical dye.

Gaussian Simulation

Gaussian simulation is a theoretical analysis approach for the physical properties and reactivity of molecules using molecular orbital calculation, and information of a stable structure, reactivity index and the like can be obtained by inputting information of a molecular structure. In this example, calculation of the maximum absorption wavelength was performed using the Gaussian simulation for the nonlinear optical dye prepared as the above. The Gaussian simulation was conducted using Gaussian09 program (available from Gaussian, Inc). Conditions for the calculation were density functional theory: DFT, wave function: B3LYP, and basis function: 6-31G*. The result is listed in Table 1.

Maximum Absorption Wavelength

The nonlinear optical dye prepared as the above was dissolved in N,N-dimethylformamide (DMF), and the absorption spectrum within a wavelength range of 190 to 1,000 nm was measured using a spectrophotometer (UV-1800 available from Shimadzu Corporation). Baseline in the measurement result was the absorption spectrum of DMF. The result is listed in Table 1.

Next, 75 mg of the nonlinear optical dye prepared as the above, 425 mg of polymethyl methacrylate (available from Sigma-Aldrich Corporation, weight-average molecular weight (Mw): 996,000) as a non-photoconductive transparent resin, and 3 cc of N,N-dimethylformamide as a solvent were mixed for 12 hours, and a photorefractive material composition was thus obtained.

The obtained photorefractive material composition was then cast to form a film on a glass base material under a condition of 110° C. for 2 hours, followed by reduced-pressure drying under a condition of 100° C. for 20 hours to remove N,N-dimethylformamide as the solvent, and a photorefractive substrate sample was obtained with a size of 1 cmϕ.

Transmittance

The light transmittance of the photorefractive substrate sample obtained as the above was measured at each of wavelengths of 445 nm, 532 nm, and 633 nm using a photodetector (DET100A/M available from Thorlabs, Inc). Results are listed in Table 1.

Relative Diffraction Efficiency

Relative diffraction efficiency is a diffraction efficiency in consideration of a loss of light due to a material, and is represented by a ratio (%) of the radiant flux of a reconstructed wave to the total sum of radiant fluxes of all diffraction orders. The measurement of the relative diffraction efficiency was performed in accordance with JIS Z 8791. Details are as follows. First, for the photorefractive substrate sample obtained as the above, the radiant fluxes of the transmitted light in a state in which a hologram was not recorded were measured using a laser (wavelength: 445 nm, output: 1 mW/mm$^2$) and a photodetector (DET100A/M available from Thorlabs, Inc.), and the measured value was adopted as the total sum of radiant fluxes of all diffraction orders. Then, hologram recording was performed for 3 minutes by a two-wave coupling method using the above laser for writing beams and a reconstruction beam, and the radiant flux of the reconstructed wave during that operation was measured using the above photodetector. The ratio of the radiant flux of the reconstructed wave to the above-described total sum of radiant fluxes of all diffraction orders was obtained in accordance with the equation below, and the obtained ratio was adopted as the relative diffraction efficiency. The result is listed in Table 1.

Relative diffraction efficiency (%)=(Radiant flux of reconstructed wave/Total sum of radiant fluxes of all diffraction orders)×100

Response Time (Diffraction Response Speed)

Measurement of the response time was performed by measuring a time required for the relative diffraction efficiency to come to 10%. Specifically, in the measurement of the relative diffraction efficiency as described above, the timing when the relative diffraction efficiency came to 10% was detected, with which the time required for the relative diffraction efficiency to come to 10% was determined. As will be understood, it can be evaluated that, the shorter the response time is, the faster the diffraction response speed is. The result is listed in Table 1.

Creation of Hologram Image

Figure 1B:
Figure 1C:
Figure 1D:
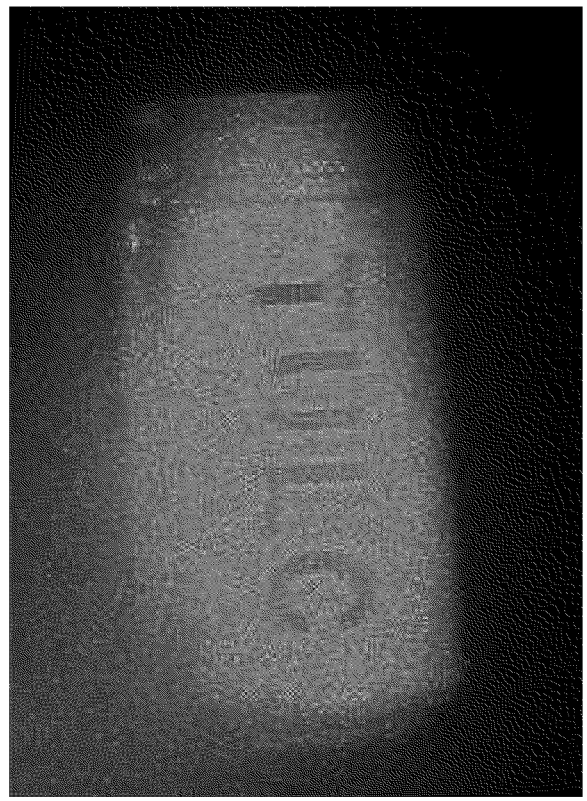

For the photorefractive substrate, a semiconductor laser of a wavelength of 405 nm was used for an object beam and a reference beam to record a hologram image of a can-shaped model as shown in FIG. 1(A). FIG. 1(B), FIG. 1(C) and FIG. 1(D) show results of reconstructing holographic images from the hologram image recorded in the photorefractive substrate using illumination beams for reconstruction. FIG. 1(B) is a photograph showing a view in which the holographic image is reconstructed with red light, FIG. 1(C) is a photograph showing a view in which the holographic image is reconstructed with green light, and FIG. 1(D) is a photograph showing a view in which the holographic image is reconstructed with blue light.

Examples 2 to 5

Photorefractive material compositions and photorefractive substrates were manufactured in the same manner as in Example 1 except that the compounds represented by the above formulae (4) to (6) and (12) were used as nonlinear optical dyes. Evaluations were conducted for the Gaussian simulation, maximum absorption wavelength, transmittance, relative diffraction efficiency, and response time in the same manner as in Example 1. Results are listed in Table 1. The nonlinear optical dyes used were a compound (4-nitro-2-picoline N-oxide) represented by the above formula (4) in Example 2, a compound (2-chloro-4-nitropyridine N-oxide) represented by the above formula (6) in Example 3, a compound (4-nitro-2,3-lutidine N-oxide) represented by the above formula (5) in Example 4, and a compound (4-nitropyridine N-oxide) represented by the above formula (12) in Example 5.

Comparative Example 1

A photorefractive material composition and a photorefractive substrate were manufactured in the same manner as in Example 1 except that the compound represented by the formula (28) below was used as a nonlinear optical dye. Evaluations were conducted for the Gaussian simulation, maximum absorption wavelength, transmittance, relative diffraction efficiency, and response time in the same manner as in Example 1. Results are listed in Table 1.

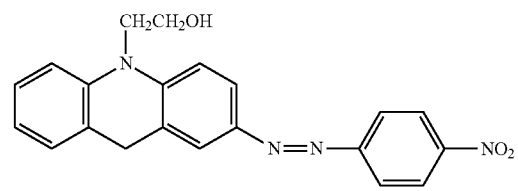

the maximum absorption wavelength: 469.8 nm

TABLE 1

| | Maximum absorption wavelength [nm] | | 633 nm Transmittance [%] | 532 nm Transmittance [%] | 442 nm | | |
|---|---|---|---|---|---|---|---|
| | Gaussian simulation | Actual measurement | | | Transmittance [%] | Relative diffraction efficiency [%] | Diffraction response speed [sec] |
| Example 1 | 322.7 | 345 | 52.1 | 12.9 | 0.6 | 25.0 | 42 |
| Example 2 | 336.3 | 354 | 73.9 | 61.2 | 38.6 | 30.7 | 48 |
| Example 3 | 336.8 | 348 | 79.1 | 64.7 | 37.8 | 43.0 | 50 |
| Example 4 | 332.3 | 351 | 65.4 | 38.8 | 21.8 | 31.5 | 18 |
| Example 5 | 330.0 | 349 | 65.4 | 61.9 | 12.1 | 78.3 | 12 |
| Comparative Example 1 | 469.8 | 443 | 75.0 | 0 | 0 | 0 | 0 |

Results of Table 1 show that, in each of the nonlinear optical dyes of Examples 1 to 5 having the structure represented by the above general formula (1), the maximum absorption wavelength is shifted toward the blue side to a wavelength within a range of 315 to 360 nm near the visible light region, compared with that of the nonlinear optical dye to be used for a non-electric field series photorefractive substrate for ordinary use as in Comparative Example 1. From these results, it has been confirmed that, when the nonlinear optical dye is used as a material of a hologram recording medium, the wavelength of laser beams used for writing a hologram image can be within the visible light region, for example, of about 380 to 470 nm, so that the operator can perform writing of the hologram image while visually recognizing the laser beams, and the workability is thus excellent in writing of a hologram image.

In addition, from the results of Table 1 and FIG. 1, it has been confirmed that each of the photorefractive material compositions containing the nonlinear optical dyes of Examples 1 to 5 transmits light of red, blue and green (light of wavelengths of 633 nm, 532 nm and 442 nm) to some extent, and therefore, when a hologram image is written, holographic images can be reconstructed from the hologram image with three primary colors of red, blue and green.

As can be seen from Table 1, in each of the nonlinear optical dyes of Examples 1 to 5 having the structure represented by the above general formula (1), the actually measured maximum absorption wavelength is approximately the same as the maximum absorption wavelength obtained by calculation in accordance with the Gaussian simulation. Therefore, it appears that each of the compounds of the above formulae (3) and (7) to (11), which has the structure represented by the above general formula (1) and of which the maximum absorption wavelength calculated by the Gaussian simulation is a wavelength within a range of 315 to 360 nm near the visible light region, may have excellent workability in writing a hologram image as in Examples 1 to 5, and holographic images can be reconstructed from the hologram image with three primary colors of red, blue and green.

Furthermore, from the results of Table 1, it has been confirmed that each of the photorefractive substrate samples containing the nonlinear optical dyes of Examples 1 to 5 has high relative diffraction efficiency and diffraction response speed and excellent workability in writing a hologram image, compared with the photorefractive substrate sample containing the nonlinear optical dye of Comparative Example 1.

What is claimed is:

1. A photorefractive material composition containing a nonlinear optical dye and a non-photoconductive transparent resin,
    wherein the nonlinear optical dye comprises a compound represented by general formula (1) below:

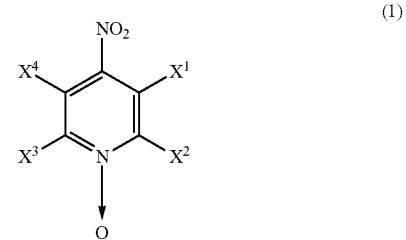

(1)

wherein each of $X^1$, $X^2$, $X^3$ and $X^4$ in the general formula (1) satisfy following equation (α3):
    (α3) compounds in which $X^1$ and $X^2$ are each a methyl group, and $X^3$ and $X^4$ are each a hydrogen atom.

2. A photorefractive substrate obtained by forming a film-like shape of the photorefractive material composition according to claim 1.

3. A hologram recording medium comprising the photorefractive substrate according to claim 2.

* * * * *